United States Patent
Nigro et al.

(10) Patent No.: US 8,539,928 B2
(45) Date of Patent: Sep. 24, 2013

(54) PISTON ASSEMBLY AND CONNECTING ROD HAVING A PROFILED WRIST PIN BORE THEREFOR

(75) Inventors: Roberto Bueno Nigro, Indian Harbour Beach, FL (US); Kai Wang, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 753 days.

(21) Appl. No.: 12/330,932

(22) Filed: Dec. 9, 2008

(65) Prior Publication Data

US 2009/0145394 A1  Jun. 11, 2009

Related U.S. Application Data

(60) Provisional application No. 61/012,530, filed on Dec. 10, 2007.

(51) Int. Cl.
*F02B 75/32* (2006.01)

(52) U.S. Cl.
USPC .................................................. 123/197.3

(58) Field of Classification Search
USPC ............... 123/197.3; 29/888.09; 384/294
See application file for complete search history.

(56) References Cited

U.S. PATENT DOCUMENTS

| | | | |
|---|---|---|---|
| 1,731,790 A | 10/1929 | Payne | |
| 2,371,400 A | 3/1945 | Mantle | |
| 2,905,511 A | 9/1959 | Cerness | |
| 4,712,941 A | 12/1987 | Emmer | |
| 4,771,744 A | 9/1988 | Corbett | |
| 4,936,163 A * | 6/1990 | Hoag et al. | 74/579 E |
| 5,192,136 A | 3/1993 | Thompson et al. | |
| 5,238,311 A | 8/1993 | Katou et al. | |
| 5,243,878 A | 9/1993 | Santi | |
| 5,520,466 A | 5/1996 | Everitt et al. | |
| 5,918,575 A | 7/1999 | Ishii | |
| 6,329,022 B1 | 12/2001 | Schlegel et al. | |
| 6,367,151 B1 | 4/2002 | Schlegel et al. | |
| 6,379,754 B1 | 4/2002 | Schlegel et al. | |
| 6,513,238 B1 | 2/2003 | Schlegel | |
| 6,560,869 B1 | 5/2003 | Schlegel et al. | |
| 6,868,810 B2 | 3/2005 | Hojo et al. | |
| 7,581,315 B2 | 9/2009 | McEwan | |
| 2002/0157534 A1* | 10/2002 | Schneider et al. | 92/187 |

(Continued)

FOREIGN PATENT DOCUMENTS

| JP | 62141920 | 9/1987 |
|---|---|---|
| JP | 478323 | 7/1992 |

(Continued)

*Primary Examiner* — M. McMahon
(74) *Attorney, Agent, or Firm* — Robert L. Stearns; Dickinson Wright, PLLC

(57) ABSTRACT

A piston assembly and connecting rod therefor is provided. The connecting rod has an elongate body extending to an end for operable attachment to a piston. The end has a wrist pin bore extending between opposite sides of the body. The wrist pin bore has a wavy profile extending between the sides. The wavy profile has at least one concave surface with a valley extending along a circumferential direction of the wrist pin bore and convex surfaces having peaks extending along a circumferential direction of the wrist pin bore on laterally opposite sides of the valley. The peaks and valleys cooperate to form a smooth load gradient and uniform lubrication flow across the interface region between the wrist pin bore and the wrist pin extending therethrough.

17 Claims, 3 Drawing Sheets

(56) References Cited

U.S. PATENT DOCUMENTS

| | | | |
|---|---|---|---|
| 2004/0065292 A1* | 4/2004 | Meyer | 123/197.3 |
| 2004/0216605 A1 | 11/2004 | Nigro et al. | |
| 2006/0101939 A1 | 5/2006 | McEwan | |
| 2008/0115621 A1 | 5/2008 | McEwan | |

FOREIGN PATENT DOCUMENTS

| | | |
|---|---|---|
| JP | 2005140220 A | 6/2005 |
| JP | 2005256917 A | 9/2005 |
| JP | 2008520928 | 6/2008 |

* cited by examiner

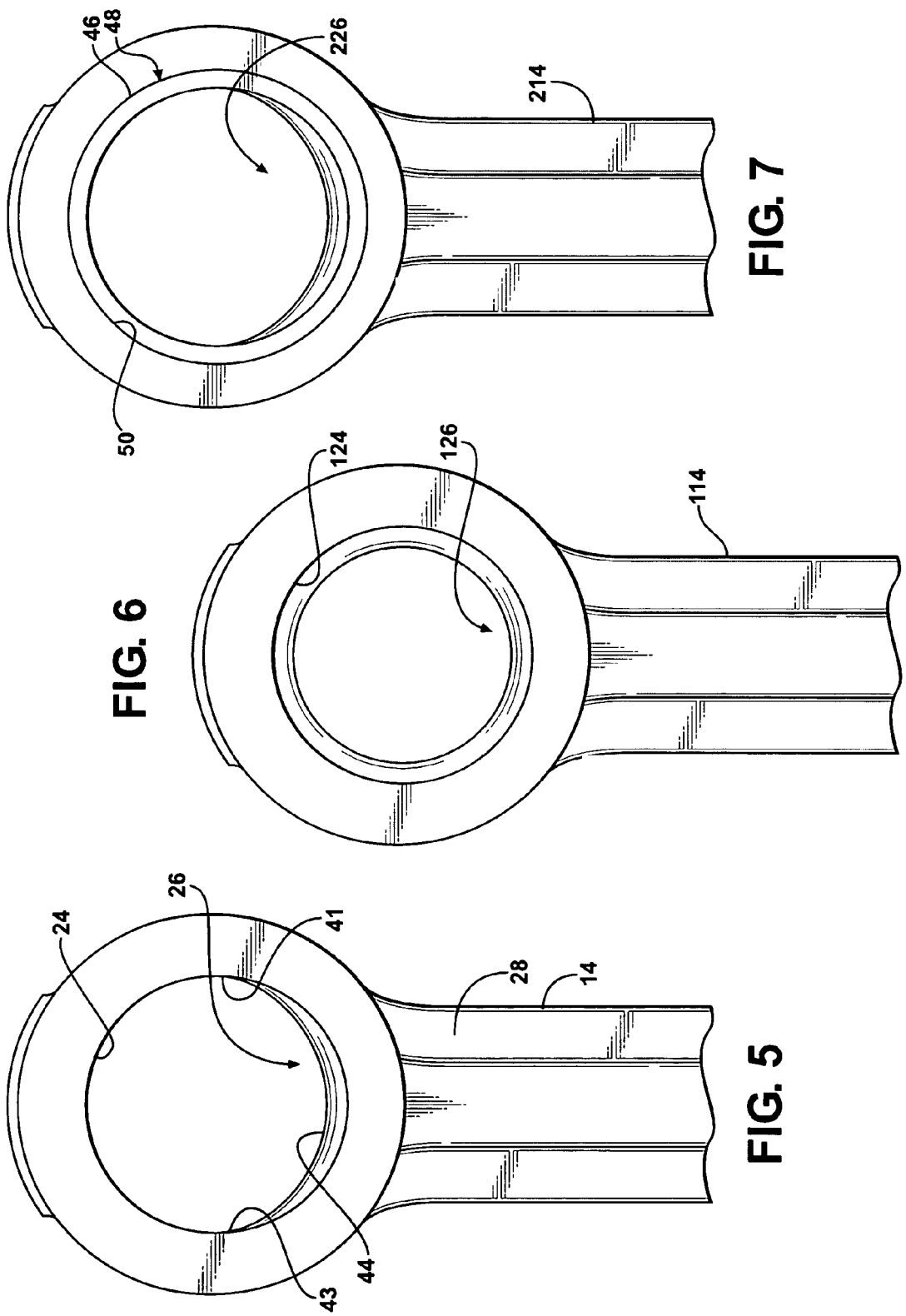

ously preferred embodiments of the invention. The description of certain terms, features or characteristics herein is intended to facilitate understanding of the invention.

PISTON ASSEMBLY AND CONNECTING ROD HAVING A PROFILED WRIST PIN BORE THEREFOR

CROSS-REFERENCE TO RELATED APPLICATION

This application claims the benefit of U.S. Provisional Application Ser. No. 61/012,530, filed Dec. 10, 2007, which is incorporated herein by reference in its entirety.

BACKGROUND OF THE INVENTION

1. Technical Field

This invention relates generally to piston assemblies for internal combustion engines, and more particularly to connecting rods within the assemblies.

2. Related Art

Conventional piston assemblies for use in internal combustion engines generally comprise a crown or head portion which provides a reaction surface for the combustion in a corresponding cylinder of the engine. A pair of laterally spaced pin bosses depend from the piston head and terminate in a pair of coaxial pin bores. A small end of a connecting rod is journaled about a wrist pin, and the wrist pin is journaled within the pin bores.

Modern vehicle engine applications are experiencing increased peak cylinder pressure demands in order to meet ever increasing performance requirements. Unfortunately, the increased peak cylinder pressure demands result in an increased pressure distribution across the pivotal joint connection between the small end of the connecting rod and the wrist pin. The increased pressure between mating bearing surfaces of the connecting rod small end and the wrist pin can result in a reduced useful life expectancy of the mating bearing surfaces. Accordingly, rather than accept the reduced life of the bearing surfaces, the peak cylinder pressures have been reduced.

When the peak cylinder pressures are increased, there are typically two main failure modes. First, the mating bearing surfaces between the wrist pin and the connecting rod small end scuff due to excessive friction. The excessive friction is exacerbated from having substantially straight, cylindrical bearing surfaces, such as that shown in a prior art connecting rod small end PA1 in FIG. 1, being in contact across their entire length, thereby producing maximum pressures at the center region CR of the mating bearing surfaces. The high pressure tends to expel the lubrication axially outwardly in the direction of arrows A, thereby creating a starvation of lubrication in the center region CR. The diminished film of lubrication in the center region CR results in increased friction, which in turn generates heat, and ultimately bearing surface fatigue. Second, bushings, typically inserted within the connecting rod small end bores, fatigue, such as at their ends or outer edges where stress concentrations are highest. Some attempts to combat this phenomenon have been made by creating a convex surface CS extending completely between the opposite ends or edges OE of the connecting rod, such as shown in another prior art connecting rod small end PA2 in FIG. 2. Unfortunately, these efforts, although reducing the pressures at the outer edges OE, still result in a reduced lubrication over the center region CR due to an ever increased pressure gradient in the center region CR.

SUMMARY OF THE INVENTION

A piston assembly constructed in accordance with one aspect of the invention has a piston crown with a pair of pin bosses depending therefrom, with the pin bosses having axially aligned pin bores. The assembly further includes a wrist pin having ends sized for at least partial receipt in the pin bores. Further yet, the assembly includes a connecting rod having an end with opposite sides with a wrist pin bore extending between the opposite sides for receipt of the wrist pin therethrough. The wrist pin bore has a wavy profile extending between the sides. The wavy profile has at least one circumferentially extending concave surface transitioning laterally to adjacent circumferentially extending convex surfaces on opposite sides of the concave surface.

Accordingly to another aspect of the invention, a connecting rod for an internal combustion engine is provided. The connecting rod has an elongate body extending to an end for operable attachment to a piston. The end has a wrist pin bore extending between opposite sides of the body. The wrist pin bore has a wavy profile extending between the sides. The wavy profile has at least one concave surface with a valley extending along a circumferential direction of the wrist pin bore. The concave surface transitions laterally to convex surfaces having peaks extending along a circumferential direction of the wrist pin bore on laterally opposite sides of the valley.

BRIEF DESCRIPTION OF THE DRAWINGS

These and other aspects, features and advantages of a piston assembly and connecting rod therefor constructed in accordance with the present invention will become more readily appreciated when considered in connection with the following detailed description of presently preferred embodiments and best mode, appended claims and accompanying drawings, in which:

FIG. 5 is a side view of the connecting rod of FIG. 3;

FIG. 6 is a side view of a connecting rod constructed according to another presently preferred embodiment; and FIG. 7 is a side view of a connecting rod constructed according to yet another presently preferred embodiment.

DETAILED DESCRIPTION OF PRESENTLY PREFERRED EMBODIMENTS

Figure 3:
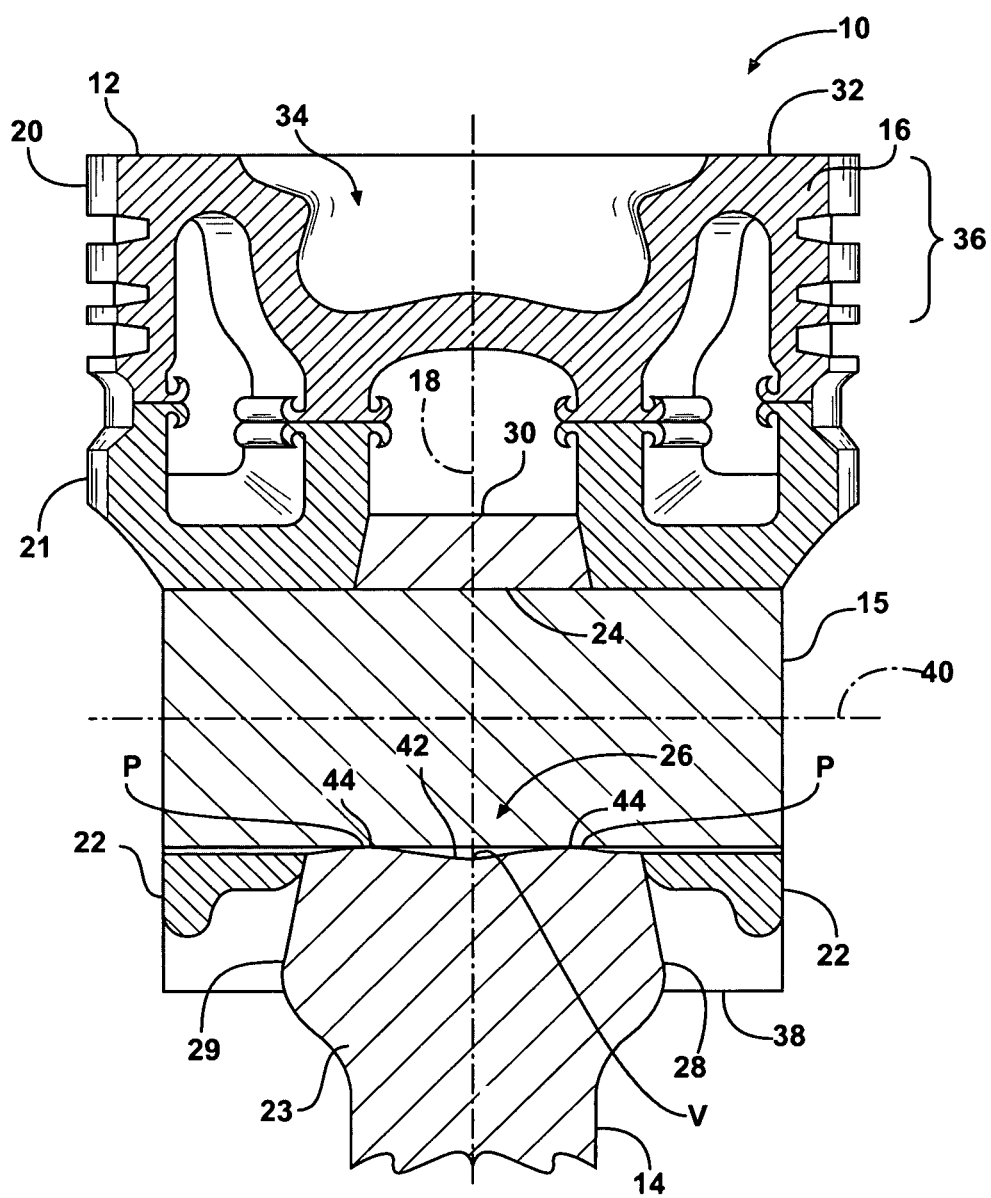
FIG. 3 is a partial cross-sectional view of a piston assembly constructed in accordance with one presently preferred embodiment of the invention.

Referring in more detail to the drawings, FIG. 3 illustrates a piston and connecting rod assembly shown generally at 10 according to one aspect of the invention. The piston and connecting rod assembly 10 includes a piston 12 and a connecting rod 14 configured for operable attachment to one another by a wrist pin 15. The piston 12 has a body 16, either cast or forged, extending along a longitudinal central axis 18 along which the piston 12 reciprocates in a cylinder bore (not shown). The body 16 is represented, by way of example and without limitation, as having an upper crown 20 attached to a lower crown 21 with a pair of pin bosses 22 depending therefrom. The connecting rod 14 has an elongate body 23 extending along a central longitudinal axis, shown here as coinciding with the axis 18, to an end or small end 30 sized for receipt between the pin bosses 22 and to another end (not shown)

configured for operable attachment to a crankshaft (not shown). The small end 30 has a wrist pin bore 24 configure for receipt of the wrist pin 15 therethrough, such that the connecting rod is operably attached to the piston 12. The wrist pin bore 24 has a profile shown generally at 26, wherein the profile 26 extends between opposite sides 28, 29 of the connecting rod 14. The profile 26 has at least one concave surface 42 transitioning to convex surfaces 44 on laterally opposite sides of the concave surface 42 to provide at least a double wave form that facilitates a generally smooth load distribution and uniform flow of lubrication between the wrist pin wrist pin 15 and the wrist pin bore 24 in use. Accordingly, the profile 26 of the wrist pin bore 24 provides the piston assembly 10 with the ability to withstand the high peak cylinder pressures of modern engines while maintaining desirable lubrication flow between the wrist pin 15 and the connecting rod 14 to avoid premature fatigue of the respective bearing surfaces.

The upper crown 20 of the piston 12 is represented here as having an upper surface 32 with a combustion bowl 34 recessed therein, as is known in piston head constructions; however, the piston 12 could have an otherwise substantially flat upper surface, if desired. An outer wall or ring belt 36 extends downwardly from the upper surface 32, with at least one annular ring groove being formed in the ring belt 36 for floating receipt of a piston ring (not shown). A pair of skirt portions 38 depend from the upper crown 20, wherein the skirt portions 38 have outer surfaces generally conforming with the cylinder bore to facilitate guiding the piston 12 during reciprocation with the cylinder bore.

Figures 1, 2, 4:
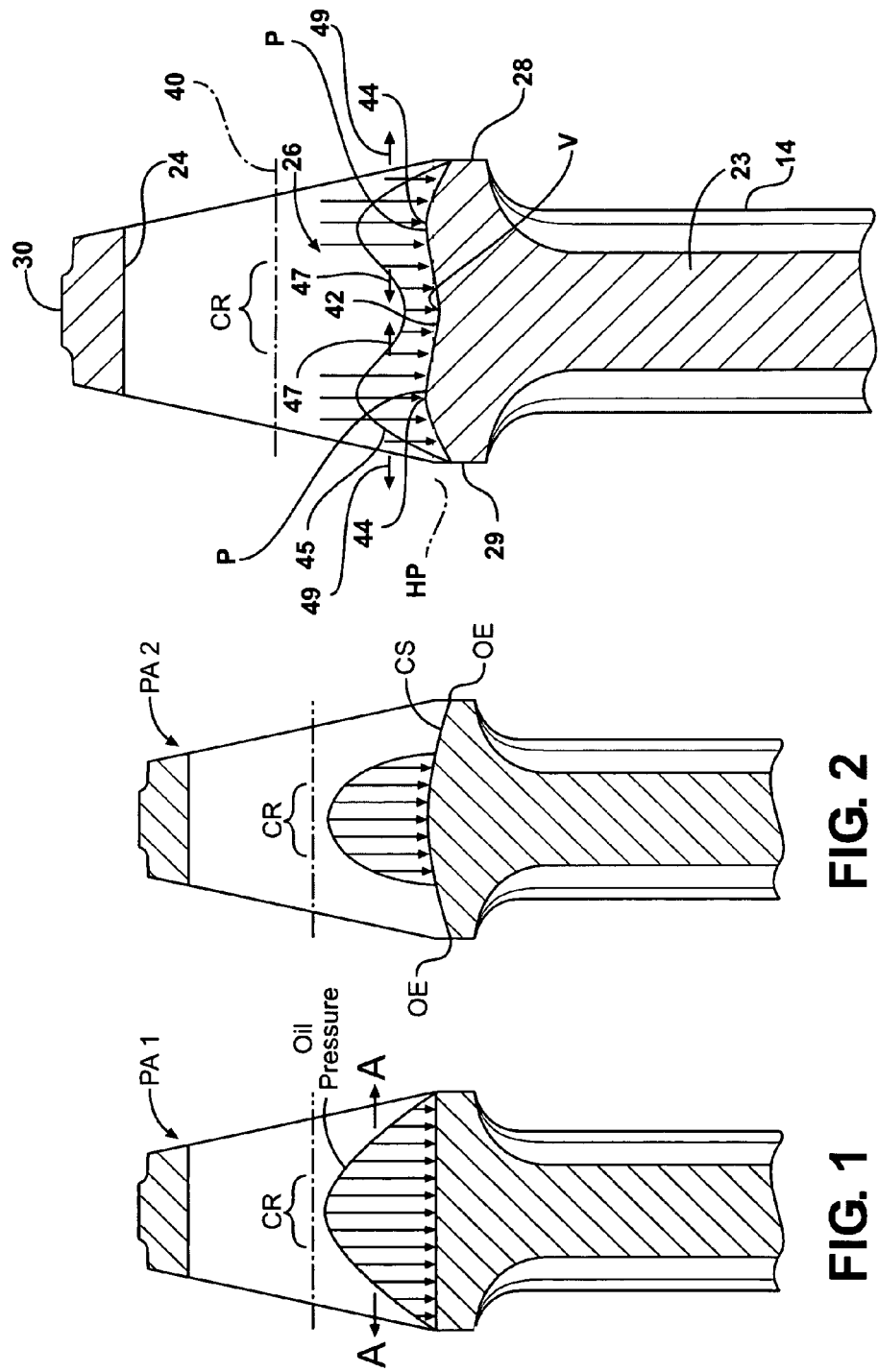
FIG. 1 is a cross-sectional view of a small end of a connecting rod constructed according to the prior art.
FIG. 2 is another cross-sectional view of a small end of a connecting rod constructed according to the prior art.
FIG. 4 is a partial cross-sectional view of a connecting rod of the assembly of FIG. 3 showing a pressure gradient and oil flow distribution over a bearing surface thereof.

As shown best in FIG. 4, the wrist pin bore 24 of the connecting rod 14 extends along a pin axis 40 between the opposite sides 28, 29, with the pin axis 40 being generally perpendicular to the longitudinal central axis 18. The profile 26 extends and undulates smoothly and continuously between the opposite sides 28, 29, and is shown in FIG. 5, by way of example and without limitation, as extending only partially about a circumference of the pin bore 24. For example, as shown in FIG. 5, the profile 26 could extend about a lower 180 degree segment of the wrist pin bore 24, from between about a 90 degree (3 o'clock) position 41 to a 270 degree (9 o'clock) position 43 relative to the longitudinal axis 18, with the remaining upper 180 degree segment of the wrist pin bore 24 having a straight, cylindrical configuration. Of course, the profile 26 could be otherwise formed having a circumferentially different degree increment than that shown in FIG. 5, as desired for the intended application. In addition, as shown in FIG. 6, wherein the same reference numerals as used above, offset by a factor of 100, are used to identify like features, a connecting rod 114 can have a wrist pin bore 124 with a profile 126 extending completely about the circumference of the pin bore 124, if desired for the particular application. Accordingly, depending on the application requirements, the profile 26, 126 can be formed to extend either partially or completely about the circumference of the respective wrist pin bore 24, 124 in any relative degree configuration about the circumference.

The profile 26 has at least one concave surface 42 that extends along a circumferential direction of the wrist pin bore 24, with the concave surface 42 being located between the opposite sides 28, 29. The concave surface 42 transitions along a lateral direction to adjacent convex surfaces 44 that extend along a circumferential direction of the wrist pin bore 24 on opposite sides of said concave surface 42. The concave surface 42 and convex surfaces 44 are formed transitioning with one another laterally across a width of the wrist pin bore 24 to provide a smooth, undulating surface, and is shown here as being sinusoidal or substantially sinusoidal. The concave and convex surfaces 42, 44 of the profile 26 are illustrated here having exaggerated peaks (P) and valleys (V), and are actually formed having peaks (P) and valleys (V) that vary from between about 5 µm to 50 µm microns relative to a horizontal plane (HP), wherein substantially equal portions of the peaks (P) and valleys (V) are located on opposite sides of the plane (P). The concave surface 42 is shown formed in a central region (CR) located centrally between the opposite sides 28, 29, wherein the central region (CR) is bisected by the longitudinal central axis 18. The convex surfaces 44 extend and undulate laterally outwardly from the concave surface 42 toward the opposite sides 28, 29, with each of the convex surfaces 44 extending in a continuous smooth form to the opposite sides 28, 29. As such, the continuous smooth profile 26 creates a smooth load distribution between the wrist pin 15 and the wrist pin bore 24, as represented by the substantially sinusoidal vertical arrows 45, and also a uniform flow of lubrication between the wrist pin 15 and the wrist pin bore 24 in use. With the concave surface 42 being centrally located between the opposite sides 28, 29 and along the central axis 18, the lubrication is directed in inwardly relative to the convex surfaces 44 toward the central axis 18, as indicated by arrows 47, as well as outwardly from the convex surfaces 44 toward the sides 28, 29, as shown in FIG. 4.

The profile 26 can be formed, such as in a machining and/or molding operation, in the material used to construct the connecting rod 14, such as steel. In addition, if the profile 26 is formed in the material of the connecting rod 14, it can be subsequently coated, if desired, such as with phosphate, for example. Otherwise, as shown in FIG. 7, wherein the same reference numerals as used above, offset by a factor of 200, are used to identify like features, a profile 226 could be formed in a bore of a bushing 46 constructed as a separate piece of material from a connecting rod 214. The bushing 46 has a substantially cylindrical outer surface 48 sized for a press fit into a substantially cylindrical through opening 50 in the connecting rod 214. The inner profile 226 of the bushing 46 can be formed as described above with regard to the profiles 26, 126, and thus, no further discussion is believed necessary.

Obviously, many modifications and variations of the present invention are possible in light of the above teachings. It is, therefore, to be understood that within the scope of the appended claims, the invention may be practiced otherwise than as specifically described.

What is claimed is:

1. A piston assembly, comprising:
a piston crown with a pair of pin bosses depending therefrom, said pin bosses having axially aligned pin bores;
a wrist pin having ends sized for at least partial receipt in said pin bores; and
a connecting rod having an end with opposite sides with a wrist pin bore extending between said opposite sides for receipt of said wrist pin, said wrist pin bore having a wavy profile extending between said sides and having at least one circumferentially extending centrally located concave surface in the central area of the bore, smoothly transitioning gradually and laterally to two adjacent circumferentially extending convex surfaces on opposite sides of said concave surface.

2. The piston assembly of claim 1 wherein said connecting rod extends along a central longitudinal axis and said concave surface is substantially bisected by said central longitudinal axis.

3. The piston assembly of claim 1 wherein said convex surfaces extend to separate ones of said opposite sides.

4. The piston assembly of claim 1 wherein said profile extends less than completely about said circumference of said wrist pin bore.

5. The piston assembly of claim 4 wherein said profile extends over about 180 degrees of the circumference of said wrist pin bore.

6. The piston assembly of claim 1 wherein said profile extends completely about the circumference of said wrist pin bore.

7. The piston assembly of claim 1 wherein said wavy profile is smooth along a direction extending between said opposite sides.

8. The piston assembly of claim 1 wherein said profile is formed in a bushing constructed from a separate piece of material from said connecting rod.

9. A connecting rod for an internal combustion engine, comprising:
   an elongate body extending to an end for operable attachment to a piston, said end having a wrist pin bore extending between opposite sides of said body, said wrist pin bore having a wavy profile extending between said sides, said wavy profile having at least one centrally located concave surface having a central valley extending along a circumferential direction of said wrist pin bore, said concave surface located in the central area of the bore and transitioning smoothly and laterally to two outer convex surfaces having peaks extending along a circumferential direction of said wrist pin bore, said peaks being on laterally opposite sides of said valley.

10. The connecting rod of claim 9 wherein said connecting rod extends along a central longitudinal axis and said concave surface is substantially bisected by said central longitudinal axis.

11. The connecting rod of claim 9 wherein said convex surfaces undulate toward separate ones of said opposite sides.

12. The connecting rod of claim 9 wherein said profile extends less than completely about said circumference of said wrist pin bore.

13. The connecting rod of claim 12 wherein said profile extends over about 180 degrees of the circumference of said wrist pin bore.

14. The connecting rod of claim 9 wherein said profile extends completely about the circumference of said wrist pin bore.

15. The connecting rod of claim 9 wherein said wavy profile undulates along a smooth surface along a direction extending between said opposite sides.

16. The connecting rod of claim 9 wherein said wavy profile is formed in a bushing constructed from a separate piece of material from said connecting rod.

17. The connecting rod of claim 16 wherein said body has a straight, cylindrical opening sized for a press fit of said bushing.

* * * * *